Oct. 9, 1962     T. E. BLAKELY     3,057,951
CONDUCTIVE CABLE CONDUIT TERMINATION
Filed Aug. 15, 1960
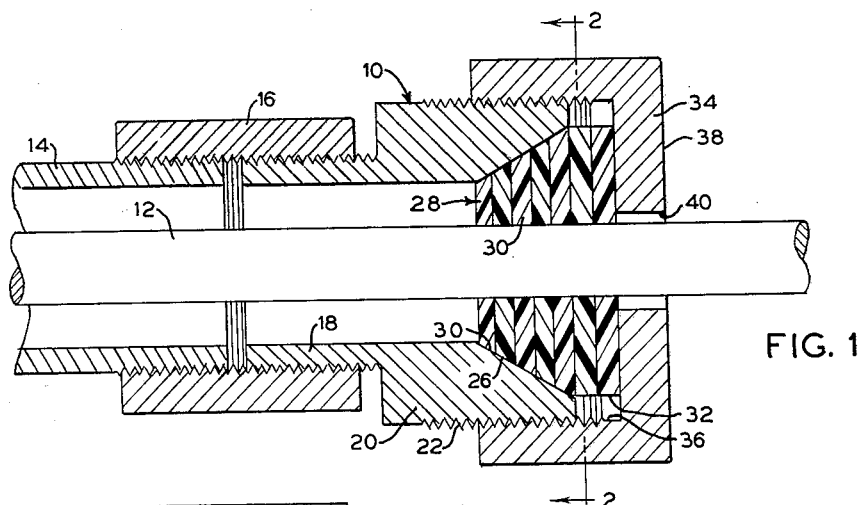
FIG. 1
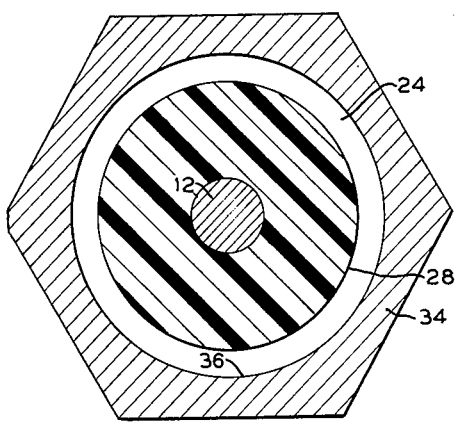
FIG. 2
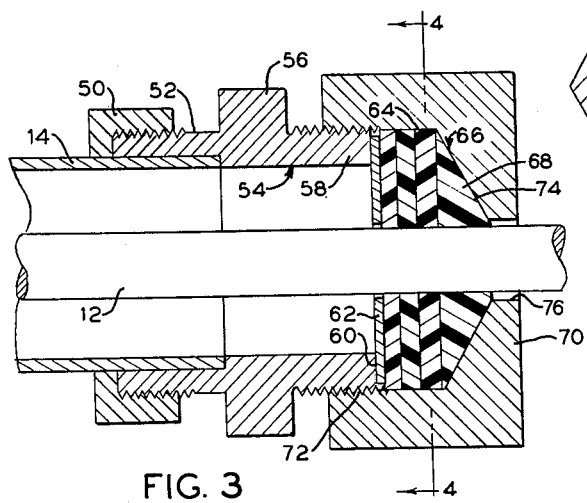
FIG. 3
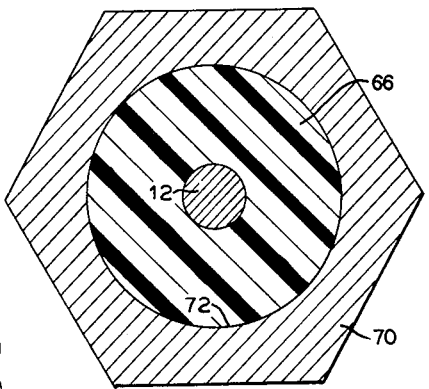
FIG. 4
*INVENTOR:*
THOMAS E. BLAKELY
BY: 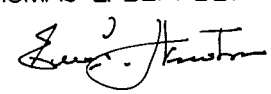
ATTORNEY

United States Patent Office 3,057,951
Patented Oct. 9, 1962

3,057,951
CONDUCTIVE CABLE CONDUIT TERMINATION
Thomas E. Blakely, 40 16th St. NW., Atlanta 9, Ga.
Filed Aug. 15, 1960, Ser. No. 49,737
4 Claims. (Cl. 174—78)

This invention relates to terminating devices for cable conduits and the like, and more particularly to terminations for providing an electrically conductive seal between a bare conductor and a surrounding co-axial conduit or raceway.

In lightning systems for buildings and the like it is necessary to have water and gas proof seals in the terminations of the conduits or raceways housing the conducting conductors. These terminations occur where the conductors extend outside of the conduits above the roof level and below the floor and/or ground level, and as a result are highly susceptible to gas and water leaks.

In addition, even if the leads at the terminal ends can be sealed, the further problem arises of arcing between the conductor and its raceway or conduit caused by the buildup of static electricity thereon. This corrodes and eventually severs the conductor. Furthermore, electrolytic action between the conductor and the conduit induces corrosion and causes breakdown of the system.

It is a primary object of this invention to provide a conductor conduit termination having a conductor extending therethrough which will effectively seal the conductor in the conduit and prevent liquid and gases from passing into the conduit and hence, into a building or the like.

Another object of this invention is to provide a conductor conduit termination having a conductor extending therethrough, which will prevent corrosion of the conductor by arcing and/or electrolytic action between the conductor and conduit.

Still another object of this invention is to provide a conductor conduit termination having a conductor extending therethrough, which will effectively seal the conduit from the entrance of liquid and gases and at the same time provide an electrically conductive connection therebetween to prevent the action of arcing and electrolysis from corroding the conductor.

Still another object of this invention is to provide a conductor conduit termination which will prevent oxidation of the surfaces between which the electrically conductive seal is effected such that the termination will maintain its conductivity and not become susceptible to damage by arcing and electrolysis.

These and other objects of this invention will become apparent from the following specification and drawings which relate to two preferred embodiments of the invention.

In the drawings:

FIGURE 1 is a side elevation in cross-section of one embodiment of the invention;

FIGURE 2 is a cross-section taken on line 2—2 of FIGURE 1;

FIGURE 3 is a side elevation in cross-section of another embodiment of the invention;

FIGURE 4 is a cross-section taken on line 4—4 of FIGURE 3.

Referring in detail to the drawings and with particular reference to FIGURES 1 and 2, one embodiment of the invention is generally shown as a termination 10 between an electrical conductor 12 and a conduit or raceway 14.

The termination 10 comprises an internally threaded coupling sleeve or adapter collar 16 threaded on the end of the conduit 14 at one end thereof and threadably receiving the externally threaded stepped-down neck portion 18 of the hollow main terminal body 20 at its other end.

The larger portion of the main body 20 is externally threaded as shown at 22. A flat end face 24 is provided thereon which extends from the threaded periphery 22 into juxtaposition with a re-entrant frustro-conical surface 26 extending from the flat end face 24 into the bore of the hollow main body 20.

A packing gland 28 having a mating frustro-conical section 30 for the re-entrant surface 26 and a cylindrical section 32 of a diameter at least as large as the largest diameter across the outer boundary of the re-entrant surface 26, is mounted concentric with the conductor 12 and in abutting relationship with the said re-entrant surface 26. This packing gland 28 is made up of a plurality of laminations resembling washers or the like cut from sheets of resilient material such as neoprene rubber which is impregnated with carbon or other conductive material. Thus, the packing gland 28 comprises a material which has the capability of creating both a water and gas proof and an electrically conductive connection between two or more surfaces.

A gland nut 34 having an enlarged internally threaded central bore 36 and an end face 38 with a central axially disposed bore therein for concentrically receiving the conductor 12 is threaded onto the main terminal body 20 at the threaded portion 22 thereof.

The cylindrical section 32 of the conductive resilient packing gland 28 engages the inner wall of the end face 38 within the enlarged bore 36 of the gland nut 34.

In operation, to effect an electrically conductive, liquid and gas proof seal between the conductor 12 and the conduit 14, by way of the previously connected coupling sleeve 16 and main terminal body 20, the gland nut 34 is brought up tight on the main body 20 by way of the threaded connection 22. This forces the frustro-conical section 30 of the packing gland 28 into solid contact with the re-entrant frustro-conical surfaces 26 in the outer end of the main body 20. The cooperating shapes of the conical section 30 of the gland 28 and the reentrant surface 26 act to compress the resilient material of the gland 28 and force it to grip the conductor 12 to provide a mechanical sealing action and an electrically conductive connection between the conductor 12 and the gland 28.

Since the packing gland 28 is driven into the re-entrant conical surface 26 by the action of the gland nut 34, an additional seal is effected between the inner wall of the end face 38 and the end face of the cylindrical section 32 of the packing gland 28.

Thus, a seal is effected between the conduit 14, conductor 12 and the termination structure 10.

Another embodiment of the invention is shown in FIGURES 3 and 4 in which the conductor and conduit are still labelled 12 and 14, respectively.

Integrally attached to the external peripheral surface of the conduit 14 spaced inward from the end thereof is an enlarged internally threaded cylindrical coupling collar 50 having an inside diameter greater than the outside diameter of the conduit 14. The difference in dimensions is sufficient to threadably receive, in positive contact with both the collar 50 and the conduit 14, an externally threaded neck portion 52 of an adapter sleeve 54 having an integral nut member 56 thereon. The neck portion 52 is counter-bored to receive the end of the conduit 14.

The outer end of the adapter sleeve 54 comprises an externally threaded coupling nipple 58 having a flat cylindrical end face 60 thereon. A metallic washer 62 mounted concentrically on the conductor 12, which is co-axial with the adapter sleeve 54, has one face in juxtaposition with the end face 60 of the adapter sleeve 54.

The other face of the washer 62 is backed up by the cylindrical section 64 of an electrically conductive, resilient packing gland 66 concentrically mounted on the conductor 12. The other end of the packing gland 66 comprises a frustro-conical section 68. The packing gland is made from the same or similar material as that disclosed for the packing gland 28 in the embodiment of FIGURES 1 and 2.

A gland nut 70 having an internally threaded, enlarged cylindrical bore 72, a frustro-conical gland seating surface or step 74 at the base of the bore 72, and a central aperture in the center of the frustro-conical step surface 74 is threadably mounted on the coupling nipple 58. The frustro-conical section 68 of the packing gland 66 is seated on the mating frustro-conical step surface 74 of the gland 12, co-axial with both the packing gland 66 and the gland nut 70, extends through the central aperture 76 in the step surface 74.

In operation, the gland nut 70 is brought up tight on the threaded connecting nipple 58 on the adapter sleeve 54 to compress the packing gland 66. The cooperating shapes of the frustro-conical section 68 of the packing gland 66 and the frustro-conical step or gland seating surface 74 on the gland nut 70, by way of the compressive force on the gland 66 act to force the packing gland into a tight liquid and gas proof and electrically conductive engagement about the conductor 12 and at the same time effect a liquid and gas proof and electrically conductive seal between the respective frustro-conical surfaces. This pressure also creates a seal between the non-threaded portion of the cylindrical bore 72 on the gland nut 70 and the cylindrical section 64 of the gland 66. The washer 62 is also forced into positive contact with the end face 60 of the threaded connecting nipple 58 on the adapter sleeve 54 on one side and into electrically conductive positive engagement with the end face of the cylindrical section 68 on the other.

Thus, the conductor 12 and conduit 14 are sealed against liquid and gas leaks and are in electrically conductive contact through the intermediaries of the electrically conductive, resilient packing gland 66 and the gland nut and adapter sleeve 70 and 54, respectively.

As can be seen from the foregoing description and drawings, this invention provides an electrical conductor conduit termination capable of effecting both a mechanical seal and an electrically conductive bond between a conductor and a conduit housing a portion of that conductor whereby leakage of liquid or gas into the conduit or the corrosion of the conductor due to arcing or electrolytic action are all eliminated.

It is to be understood, that the embodiments shown and described herein are for the purpose of example only, and are not intended to limit the scope of the appended claims.

I claim:

1. In a gas and liquid proof, electrically conductive termination of the class wherein a conduit has an electric conductor co-axially extending therethrough, the combination therewith of, a threaded adapter collar on the end of said conduit, a main body portion secured to said collar and enclosing said conductor, a resilient, electrically conductive packing gland mounted concentrically on said conductor, and a gland nut having an enlarged bore therein receiving said packing gland and threadably secured to the said main body portion, whereby when said nut is brought up tight on said main body said packing gland will be compressed thereagainst and into firm engagement with said conductor to effect a liquid and gas proof and electrically conductive seal between said conduit, said conductor and said termination.

2. In a gas and liquid proof, electrically conductive termination of the class wherein a conduit has an electric conductor co-axially extending therethrough, the combination therewith of, a threaded adapter collar on the end of said conduit, a main body portion having a bore co-axially enclosing said conductor secured at one end to said collar and having a re-entrant frustro-conical surface at the other end thereof extending from an outer flat end face to the said bore, a resilient, electrically conductive packing gland concentrically mounted on said conductor including a frustro-conical section and a cylindrical section, the frustro-conical section engaging the re-entrant surface of said main body portion, and a gland nut threadably secured to said main body portion having an enlarged cylindrical bore therein partially closed at one end and receiving the cylindrical section of said packing gland, the gland nut including a smaller bore in said partially closed end providing a passageway for said conductor, said packing gland being between said main body portion and said gland nut, whereby when said gland nut is brought up tight on said main body portion the frustro-conical section of said packing gland is forced into positive engagement with the said re-entrant surface on said main body portion and the resulting compressive action on the gland creates a positive gripping action between the gland and said conductor to form a gas and liquid proof and electrically conductive seal between said conduit, said conductor and said termination.

3. In a gas and liquid proof, electrically conductive termination of the class wherein a conduit has an electric conductor co-axially extending therethrough, the combination therewith of, a threaded adapter collar on the end of said conduit, a main body portion having a bore co-axially enclosing said conductor secured at one end to said collar and having a flat end face concentric with said bore at the other end thereof, a resilient, electrically conductive packing gland concentrically mounted on said conductor including a frustro-conical section and a cylindrical section wherein the cylindrical section thereof is adapted to engage the said flat end face on said main body portion, and a gland nut threadably secured to said main body portion and having a stepped axial bore therein wherein the step comprises a frustro-conical surface adapted to engage the said frustro-conical section of said packing gland, said packing gland being between said main body portion and said gland nut, whereby when said gland nut is brought up tight on the said main body portion the said frustro-conical section of said packing gland is forced into positive engagement with the surface of said step and the cylindrical section thereof is forced into engagement with the said flat end face on said main body portion and the resulting compressive action on the gland creates a positive gripping action between the gland and said conductor to form a gas and liquid proof and electrically conductive seal between said conduit, said conductor and said termination.

4. In a termination of the class wherein a conduit has an electrical conductor extending co-axially therethrough, the combination therewith of a main body portion having an axial bore therein for co-axially receiving said conductor, a resilient packing gland concentrically mounted on said conductor and having at least one frustro-conical end face thereon, and a gland nut having a stepped bore therein co-axially receiving both said packing gland and said conductor and threadably connected with said main body portion such that said packing gland is confined therebetween, at least one of the said main body portion or gland nut having a frustro-conical surface cooperating with said frustro-conical end face on said packing gland whereby when said gland nut is brought up tight on said main body portion said packing gland is compressed to positively grip said conductor and effect a seal between said conductor and said termination.

References Cited in the file of this patent

UNITED STATES PATENTS

| 505,369 | Rhodes | Sept. 19, 1893 |
| 859,813 | Hartmann | July 9, 1907 |
| 1,929,905 | Slotsky | Oct. 10, 1933 |
| 2,589,876 | Sesher | Mar. 18, 1952 |